US008477882B2

(12) United States Patent
Miyata

(10) Patent No.: US 8,477,882 B2
(45) Date of Patent: Jul. 2, 2013

(54) RADIO APPARATUS

(75) Inventor: Takeo Miyata, Gifu (JP)

(73) Assignee: Kyocera Corporation, Kyoto (JP)

( * ) Notice: Subject to any disclaimer, the term of this patent is extended or adjusted under 35 U.S.C. 154(b) by 355 days.

(21) Appl. No.: 12/922,442

(22) PCT Filed: Feb. 24, 2009

(86) PCT No.: PCT/JP2009/000812
§ 371 (c)(1),
(2), (4) Date: Sep. 13, 2010

(87) PCT Pub. No.: WO2009/113253
PCT Pub. Date: Sep. 17, 2009

(65) Prior Publication Data
US 2011/0019779 A1    Jan. 27, 2011

(30) Foreign Application Priority Data

Mar. 14, 2008  (JP) ................. 2008-065359

(51) Int. Cl.
*H04L 27/06* (2006.01)

(52) U.S. Cl.
USPC ........... 375/340; 375/260; 375/262; 375/267; 375/299; 375/316; 375/341; 375/347; 455/101; 455/132; 455/296; 455/500; 455/562.1; 370/210; 370/319; 370/334; 370/343; 370/464; 370/480; 341/173; 341/180

(58) Field of Classification Search
USPC ................. 375/260, 262, 267, 299, 316, 340, 375/341, 347; 455/101, 132, 296, 500, 562.1; 370/210, 319, 334, 343, 464, 480; 341/173, 341/180
See application file for complete search history.

(56) References Cited

U.S. PATENT DOCUMENTS 7,634,026 B2 * 12/2009 Tanaka et al. ................. 375/316
2008/0132172 A1    6/2008 Yoshii et al.

FOREIGN PATENT DOCUMENTS

| CN | 1813375 A | 8/2006 |
|---|---|---|
| CN | 1833388 A | 9/2006 |
| JP | 2002-198878 | 7/2002 |
| JP | 2006-157588 | 6/2006 |
| JP | 2006-186421 | 7/2006 |
| JP | 2006-237692 | 9/2006 |
| JP | 2008-011157 | 1/2008 |
| WO | WO-2006/059565 | 6/2006 |

OTHER PUBLICATIONS

International Search Report for PCT/JP2009/000812, mailed on Apr. 7, 2009, 1 page.
International Preliminary Report on Patentability for PCT/JP2009/000812, issued Nov. 2, 2010, 5 pages.
Notification of Reason(s) for Refusal (translation) for JP 2008-065359, mailed Aug. 16, 2011, 2 pages.
Office Action for Korean Patent Application No. 10-2010-7020284, mailed Feb. 10, 2012, 6 pages (including English translation).
CN200980106968 Office Action mailed Sep. 6, 2012.

* cited by examiner

*Primary Examiner* — Leon Flores
(74) *Attorney, Agent, or Firm* — Duane Morris LLP

(57) ABSTRACT

An RF unit receives multicarrier signals via a plurality of antennas. A division unit divides the multicarrier signals received into a plurality of groups in the frequency domain. The division unit acquires the channel quality for each subcarrier, contained in the multicarrier signal, in the frequency domain, and defines the plurality of groups according to the channel quality. The processing unit performs adaptive array signal processing for each of the divided groups.

3 Claims, 8 Drawing Sheets

RADIO APPARATUS

CROSS-REFERENCE TO RELATED APPLICATIONS

This is a U.S. National Phase Application of International Application No. PCT/JP2009/000812 filed Feb. 24, 2009, which claims priority to Japanese Patent Application No. 2008-065359 filed Mar. 14, 2008, the disclosures of which are incorporated herein by reference in their entirety.

TECHNICAL FIELD

The present invention relates to a communication technology, and it particularly relates to a radio apparatus for receiving multicarrier signals by a plurality of antennas.

BACKGROUND TECHNOLOGY

In wireless communications, it is generally desired that the limited frequency resources be used effectively. In order to effectively utilize the frequency resources, the radio waves of the same frequency are used repeatedly as close in distance as possible, for example. In that case, the communication quality degrades due to the co-channel interference from neighboring base station apparatuses or the like that use the same frequency. One of the techniques to prevent the degradation of communication quality due to the co-channel interference is adaptive array antenna technology. In the adaptive array antenna technology, the signals received by a plurality of antennas, respectively, are weighted with different weighting factors and then combined together.

To adaptively update the weighting factors, adaptive algorithms, such as RLS (Recursive Least Squares) algorithm and LMS (Least Mean Squares) algorithm, are used. There are also cases where the weighting factors are calculated based on the response characteristics in a channel between a transmitting side and a receiving side. Adaptive array signal processing like this is sometimes applied to a multicarrier signal such as an OFDM (Orthogonal Frequency Division Multiplexing) signal (See Patent Document 1, for instance).

[Patent Document 1] Japanese Patent Application Publication No. 2006-186421.

DISCLOSURE OF THE INVENTION

Problems to be Solved by the Invention

A weight vector is derived in the adaptive array signal processing. Since each multicarrier signal is composed of a plurality of subcarriers, deriving the weight vector on a subcarrier-by-subcarrier basis entails an increase in the calculation amount. To suppress such an increase in the calculation amount, a common weight vector is used over a plurality of subcarriers. However, where the interference level differs for each subcarrier, the use of the common weight vector does not achieve sufficient capacity in the removal of interference.

The present invention has been made in view of the foregoing circumstances, and a purpose thereof is to provide a communication technology by which the increase in the amount of calculation is suppressed and at the same time the degradation of interference removal capacity is suppressed.

Means for Solving the Problems

In order to resolve the above problems, a radio apparatus according to one embodiment of the present invention comprises: a receiver configured to receive multicarrier signals via a plurality of antennas; a division unit configured to divide the multicarrier signals received by the receiver, into a plurality of groups in frequency domain; and a processing unit configured to perform adaptive array signal processing for each of the groups divided by the division unit. The division unit acquires a channel quality for each subcarrier, in frequency domain, contained in the multicarrier signal and sets the plurality of groups according to the channel quality.

Another embodiment of the present invention relates also to a radio apparatus. The radio apparatus comprises: a communication unit configured to communicate with a radio apparatus to be communicated, using a multicarrier signal via a plurality of antennas; a division unit configured to divide the multicarrier signal used for the communication, into a plurality of groups at least in frequency domain; and a processing unit configured to perform adaptive array signal processing for each of the plurality of groups divided by the division unit. The division unit acquires channel quality for the multicarrier signal; when the channel quality deteriorates as compared with a threshold value, the division unit assigns contiguous subcarriers, in frequency domain, contained in the multicarrier signal to the each of the plurality of groups.

Optional combinations of the aforementioned constituting elements, and implementations of the invention in the form of methods, apparatuses, systems, recording media, computer programs and so forth may also be practiced as additional modes of the present invention.

Effect of the Invention

The present invention suppresses the increase in the amount of calculation and at the same time suppresses the degradation of interference removal capacity.

DESCRIPTION OF THE REFERENCE NUMERALS

Figure 1:
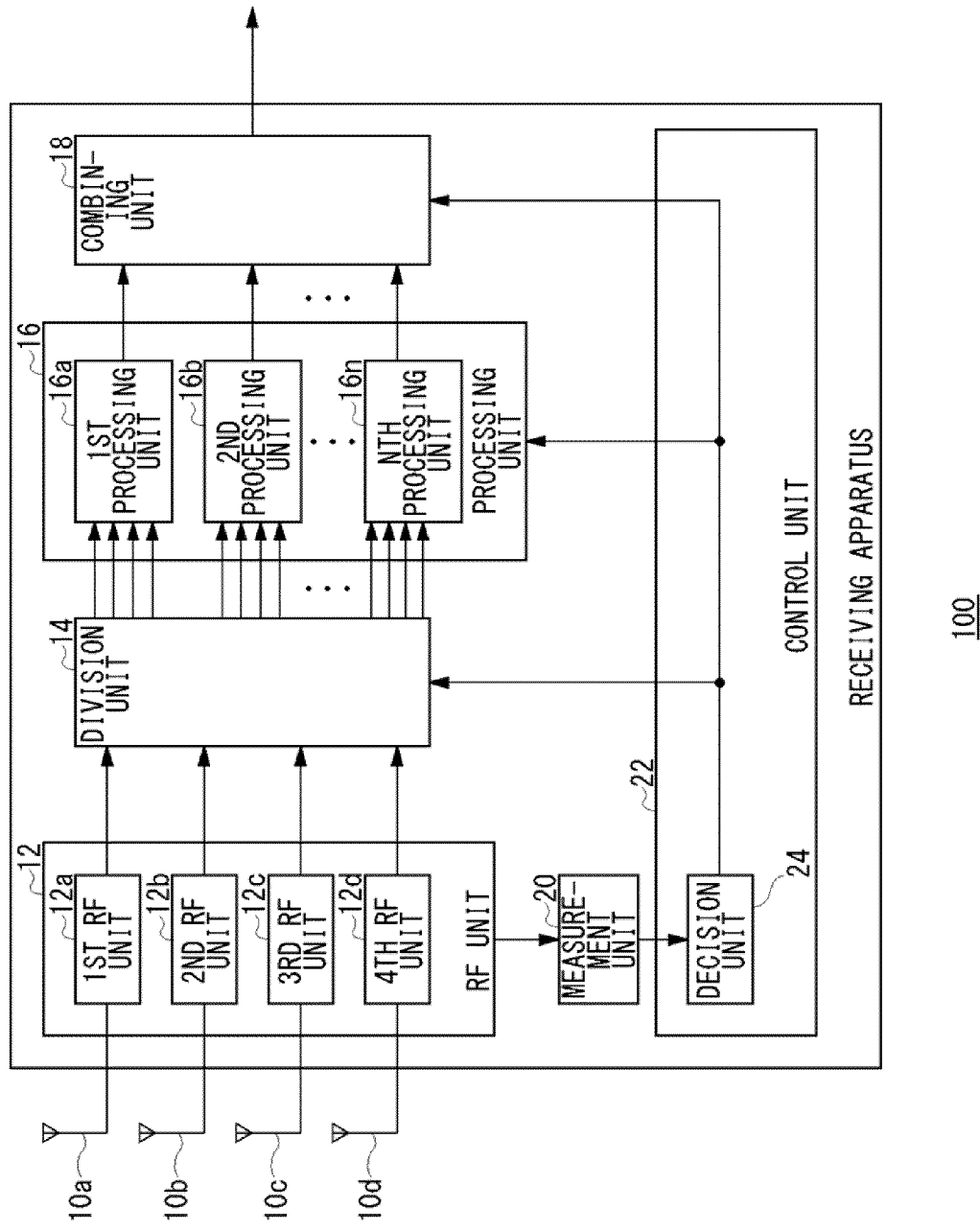
FIG. 1 shows a structure of a receiving apparatus according to an exemplary embodiment of the present invention.

10 Antenna
12 RF unit
14 Division unit
16 Processing unit
18 Combining unit
20 Measurement unit
22 Control unit
24 Decision unit
40 Multiplier 42 Adder
44 Weight computing unit
100 Receiving apparatus

BEST MODE FOR CARRYING OUT THE INVENTION

The present invention will be first outlined before the specifics thereof are explained. The exemplary embodiment of the invention relates to a receiving apparatus which is equipped with a plurality of antennas and receives OFDM signals. An OFDM signal constitutes a packet signal and a burst signal in the time domain. Hereinafter, the OFDM signal constituting a packet signal and a burst signal will be referred to as "OFDM signal" also. The receiving apparatus receives OFDM signals via a plurality of antennas, and performs adaptive array signal processing of the OFDM signals. Though a receiving weight vector is derived in the adaptive array signal processing, the amount of calculation will be large if the receiving weight vector is derived on a subcarrier-by-subcarrier basis. At the same time, the adaptive array signal processing requires the interference removal capacity. To suppress the increase in the amount of calculation and at same time suppress the degradation of the interference removal capacity, the receiving apparatus according to the present exemplary embodiment executes the following processing.

The receiving apparatus performs carrier sense beforehand on a subcarrier-by-subcarrier basis, and acquires the interference level of each subcarrier. Also, if the interference levels in adjacent subcarriers are close to each other, the receiving apparatus will put such subcarriers into a single group. Further, the similar processing is repeatedly performed on the subsequent subcarriers and thereby the receiving apparatus divides OFDM signals into a plurality of groups. In other words, those subcarriers having a close level of interference are gathered together into a group. Assume herein that a plurality of subcarriers contained in each group are contiguous and that the maximum number of subcarriers contained in each group is predetermined. The receiving apparatus generates a common receiving weight vector in units of group and performs adaptive array signal processing using the thus generated receiving weight vector.

FIG. 1 shows a structure of a receiving apparatus 100 according to the exemplary embodiment of the present invention. The receiving apparatus 100 includes a first antenna 10a, a second antenna 10b, a third antenna 10c and a fourth antenna 10d, which are generically referred to as "antenna 10" or "antennas 10", a first RF unit 12a, a second RF unit 12b, a third RF unit 12c and a fourth RF unit 12d, which are generically referred to as "RF unit 12" or "RF units 12", a division unit 14, a first processing unit 16a, a second processing unit 16b, . . . and an Nth processing unit 16n, which are generically referred to as "processing unit 16" or "processing units 16", a combining unit 18, a measurement unit 20, and a control unit 22. The control unit 22 includes a decision unit 24.

A plurality of RF units 12 are connected in association with a plurality of antennas 10. The RF units 12 receive OFDM signals via the antennas 10. Note that the OFDM signals are transmitted from a not-shown transmitter. Also, the OFDM signal constitutes a burst signal in the time domain; a known signal may be assigned to an anterior part of burst signal, and following the known signal a data signal may be assigned. Also, the OFDM signal has a radiofrequency. As the RF unit 12 receives a radiofrequency-band OFDM signal, the RF unit 12 performs frequency conversion on the radiofrequency-band OFDM signal. As a result, the RF unit 12 generates a baseband OFDM signal.

Further, the RF unit 12 performs FFT (Fast Fourier Transform) on the baseband OFDM signal. As a result, an OFDM signal in the time domain is converted into an OFDM signal in the frequency domain. The OFDM signal in the frequency domain (hereinafter simply referred to as "OFDM signal") has values associated with a plurality of subcarriers. Since each value is constituted by an in-phase component and a quadrature component, the values shall be represented by twice as many signal lines as the number of subcarriers. For clarity of Figures, it is assumed here that each OFDM signal is represented by a single signal line only. The RF unit 12 outputs the OFDM signal to the division unit 14. In a period of carrier sense, the RF unit 12 outputs an interference signal converted into one in the frequency domain (hereinafter simply referred to "interference signal") to the measurement unit 20.

Figure 2:
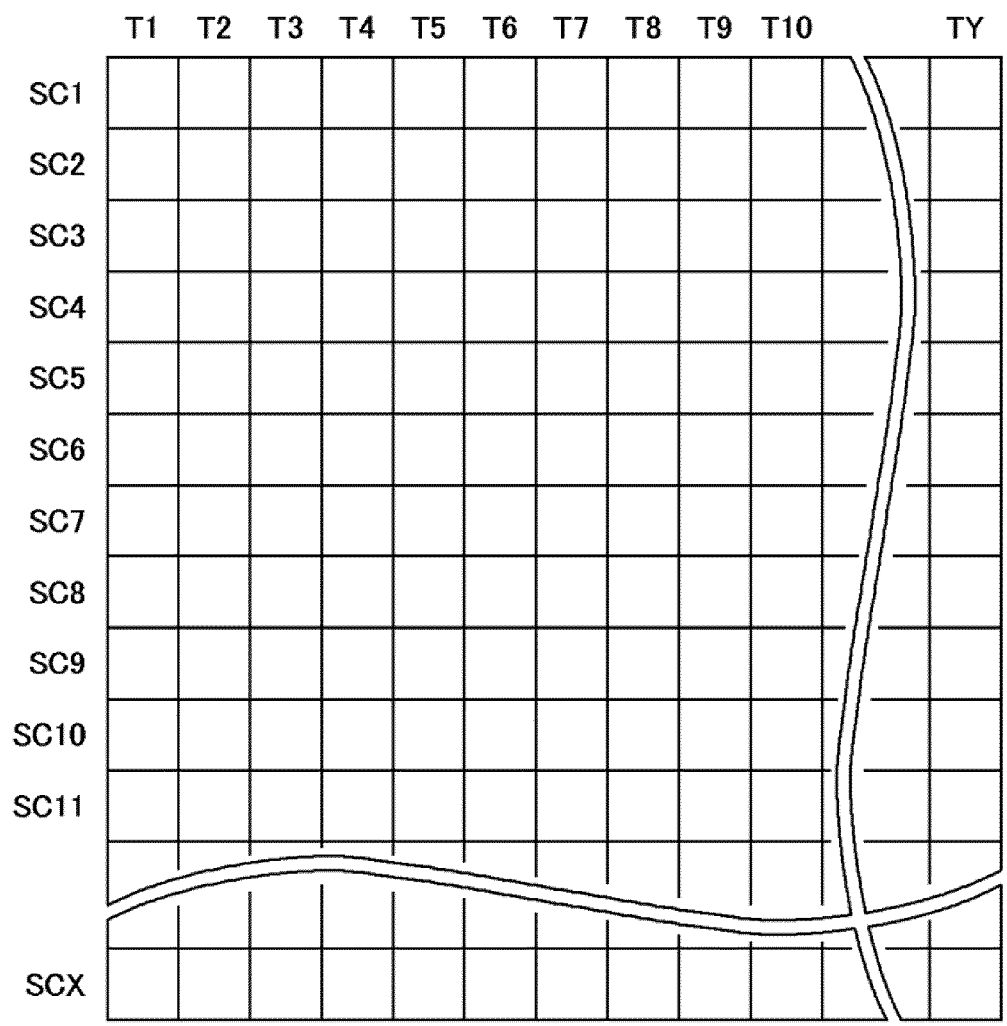
FIG. 2 shows a format of signal received by the receiving apparatus of FIG. 1.

FIG. 2 shows a format of signal received by the receiving apparatus 100. This corresponds to a frequency-domain OFDM signal generated by the RF unit 12. The vertical axis of FIG. 2 corresponds to the frequency axis. As shown in FIG. 2, X subcarriers whose subcarrier numbers are designated by "1" to "X" are arranged in the frequency-axis direction. Hereinafter, the term "subcarrier number" will be abbreviated by "SC number". The horizontal axis of FIG. 2 corresponds to the time axis. As shown in FIG. 2, Y symbols whose symbol numbers are designated by "1" to "Y" are arranged in the time-axis direction. Hereinafter, the term "symbol number" will be abbreviated by "T number". For clarity of explanation, a combination of subcarrier and symbol will be hereinafter referred to as "data". The data contains the aforementioned known signal also.

The measurement unit 20 receives interference signals from the RF units 12 in a period of carrier sense. Since there are four RF units 12, four kinds of interference signals are inputted to the measurement unit 20. As shown in FIG. 2, each interference signal is also constituted by X SC's and Y T's. The measurement unit 20 derives the power of interference signal in units of data. Hereinafter, the power of interference signal will be referred to as "interference level". More specifically, each data is constituted by an in-phase component and a quadrature component; the measurement unit 20 calculates the size of each data. Also, there are three other data that correspond to the same subcarrier and the same symbol. Thus the measurement unit 20 accumulates them so as to derive an interference level for each data. As the interference level is once derived for an interference signal, the measurement unit 20 outputs the thus derived interference level to the decision unit 24.

The decision unit 24 receives the interference level from the measurement unit 20. Also, the decision unit 24 defines beforehand a plurality of stages for the interference level. For example, threshold values "A1" and "A2" are defined such that A1<A2, and three different stages may be defined as a stage less than A1, a stage greater than or equal to A1 and less than A2, and a stage greater than A2, for example. The decision unit 24 compares the interference level and the threshold values in units of data, so that each data is associated with any one of a plurality of stages. Such processing is performed on not only the data in the frequency-axis direction but also the data in the time-axis direction; for simplicity of explanation, such processing is explained hereunder as one for a predetermined symbol. That is, the decision unit 24 associates each data in the frequency-axis direction contained in a predetermined symbol with any one of the stages.

The decision unit 24 determines whether the stage in adjacent subcarriers is the same or not. If the stage is determined to be the same, the decision unit 24 will further determine whether those neighboring to the aforementioned adjacent subcarriers belong to the same stage or not. For example, the decision unit 24 compares SC1 of the minimum frequency with SC2 located adjacent to SC1. If both SC1 and SC2 belong to the same stage, the decision unit 24 will additionally compare them with SC3. By repeating such processing, the decision unit 24 divides OFDM signals into a plurality of groups. In that case, a group is a set of contiguous subcarriers associated with the same stage. In what is to follow, a group or groups included in a given group will be called "group" as well.

In other words, the decision unit 24 acquires the interference level on a subcarrier-by-subcarrier basis and sets a plurality of groups according to their interference levels. Note here that the maximum number of subcarriers which is possibly contained in each group (hereinafter referred to as "maximum number") is defined beforehand by the decision unit 24. Thus, if the number of subcarriers in a given group reaches the maximum number, an adjacent subcarrier will not be included in the same group even though said adjacent subcarrier belongs to the same stage. The decision unit 24 generates a correspondence between a group and subcarriers, as information for the group. Further, the decision unit 24 outputs the group information to the division unit 14, the processing unit 16 and the combining unit 18.

The division unit 14 receives OFDM signals from the four RF units 12, respectively. Also, the division unit 14 receives the group information from the decision unit 24. The division unit 14 divides the OFDM signals into a plurality of groups, respectively, based on the group information. For example, if a first group is so defined as to contain the SC numbers "1" to "3" for a predetermined symbol, the division unit 14 will extract signals associated with the SC numbers "1" to "3" from each OFDM signal and then output the extracted signals to the first processing unit 16a. The division unit 14 outputs a plurality of groups to a plurality of processing units 16, respectively.

The processing units 16 are provided in a manner such that the processing units 16 are associated respectively with a plurality of groups. Each processing unit 16 performs adaptive array signal processing on the group received by the division unit 14. In the adaptive array signal processing, a receiving weight vector is generally calculated from four signals associated with each subcarrier (hereinafter referred to as "input vector") and a reference signal. In the adaptive array signal processing, the input vectors are each weighted with the receiving weight vector so as to be combined. The processing units 16 output the combined results (hereinafter referred to as "combined signals") to the combining unit 18.

An adaptive algorithm such as LMS algorithm is used in the calculation of the receiving weight vector. In such a case, each one kind of receiving weight vector is calculated in each processing unit 16, and the thus calculated weight vector is applied to all subcarriers in each group. In other words, a weight vector for one subcarrier in each group is calculated and the thus calculated weight vector is applied to all the other subcarriers as well. The first processing unit 16a to the Nth processing unit 16n carry out the above-described processing in common with one another but a group to be processed differs for each processing unit 16.

The combining unit 18 receives the combined signals fed from the plurality of processing units 16, respectively. The combining unit 18 combines a plurality of combined signals. Since each combined signal corresponds to a mutually different subcarrier, the combining unit 18 arranges these subcarriers in order of their SC numbers. The combining unit 18 demodulates the combined results and outputs the demodulated results. The control unit 22 controls the timing of the receiving apparatus 100 as a whole.

These structural components may be implemented hardwarewise by a CPU, memory and other LSIs of an arbitrary computer, and softwarewise by memory-loaded programs or the like. Depicted herein are functional blocks implemented by cooperation of hardware and software. Therefore, it will be obvious to those skilled in the art that the functional blocks may be implemented by a variety of manners including hardware only, software only or a combination of both.

Figure 3:
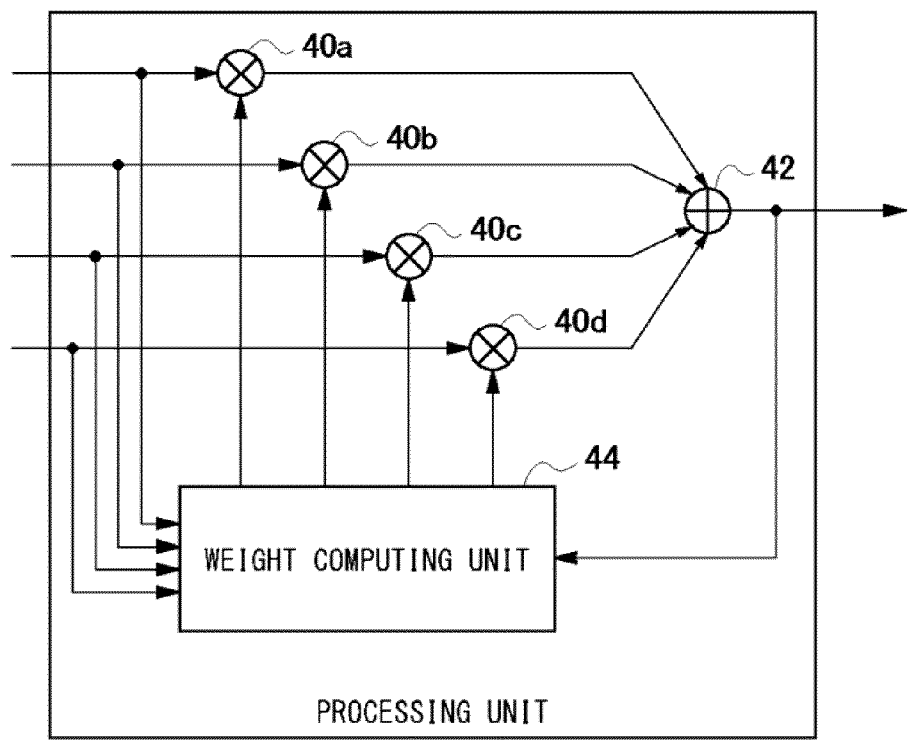
FIG. 3 shows a structure of a processing unit of FIG. 1.

FIG. 3 shows a structure of the processing unit 16. The signal processing unit 16 includes a first multiplier 40a, a second multiplier 40b, a third multiplier 40c and a fourth multiplier 40d, which are generically referred to as "multiplier 40" or "multipliers 40", an adder 42, and a weight computing unit 44.

The weight computing unit 44 derives a receiving weight vector by performing an LMS algorithm. The LMS algorithm is a known technique and therefore the description thereof is omitted here. The weight computing unit 44 computes a receiving weight vector for a subcarrier in a group. The weight vector computing unit 44 outputs the receiving weight vector to the multiplier 40.

The multiplier 40 receives the input vector and the receiving weight vector. Also, the multiplier 40 weights the input vector with the receiving weight vector and then outputs the weighted input vector to the adder 42. Note that the multiplier 40 receives an input vector corresponding to at least one subcarrier contained in a group and receives one kind of values as the receiving weight vector corresponding to the at least one subcarrier. The adder 42 receives weighting results fed from the adder 42 and accumulates them so as to generate the aforementioned combined signal.

Figure 4:
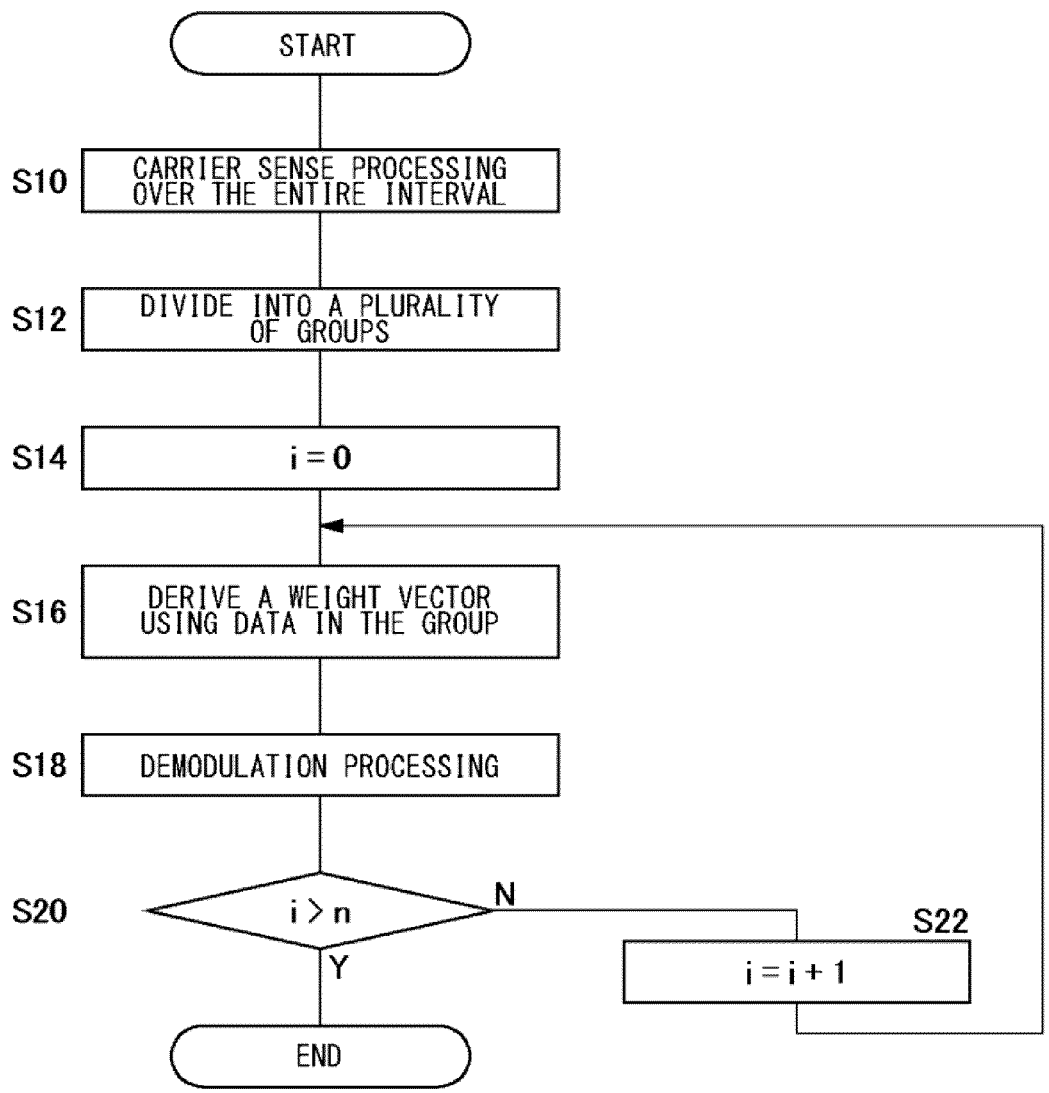
FIG. 4 is a flowchart showing a receiving processing performed by the receiving apparatus of FIG. 1.

An operation of the receiving apparatus 100 structured as above will be described. FIG. 4 is a flowchart showing a receiving processing performed by the receiving apparatus 100. The measurement unit 20 performs carrier sense over the entire interval (S10). The decision unit 24 divides OFDM signals into a plurality of groups, based on the result of carrier sense (S12). The decision unit 24 sets "i" to "0" (S14). The processing unit 16 derives a receiving weight vector using data in the group (S16). The processing unit 16 and the combining unit 18 perform demodulation processing (S18). If i>n does not hold (N of S20), the decision unit 24 will add "1" to "i" (S22) and the procedure will be returned to Step 16. If, on the other hand, i>n holds (Y of S20), the processing will be terminated.

A description is now given of a modification of the exemplary embodiment. Similar to the exemplary embodiment, the modification relates to a receiving apparatus wherein the OFDM signals are divided into a plurality of groups and the adaptive array signal processing is performed on the groups. The receiving apparatus according to the exemplary embodiment performs adaptive array signal processing on each group. In contrast thereto, to reduce the amount of calculation, the receiving apparatus according to the modification performs adaptive array signal processing on not every group but some of the groups only. More specifically, the receiving apparatus selects some groups whose interference level is large, and performs adaptive array signal processing on the selected groups.

A receiving apparatus 100 according to the modification is of a similar type to the receiving apparatus 100 shown in FIG.

1. Thus, only the differences will be mainly described hereinbelow. The decision unit 24 defines a plurality of groups and then checks the stage for each group. Based on the stages for the plurality of groups, the decision unit 24 identifies groups, whose interference level is large, out of the plurality of groups. The number of groups to be identified may be predetermined or all groups whose interference level is greater than a threshold value may be identified. The decision unit 24 adds the thus identified groups to the aforementioned group information. Further, the decision unit 24 outputs the group information to the division unit 14, the processing unit 16, and the combining unit 18.

The processing unit 16 receives the group information from the decision unit 24. The processing units 16 corresponding to the identified groups perform adaptive array signal processing. In other words, the adaptive array signal processing is preferentially performed on groups whose channel quality is degraded. The processing units 16, corresponding to groups which are not identified, select any of OFDM signals associated respectively with the plurality of antennas 10 and outputs the selected OFDM signals to the combining unit 18 as a combined signal. Though no adaptive array signal processing is performed on the groups whose interference level is small, the degradation of the receiving quality is considered to be small.

Figure 5:
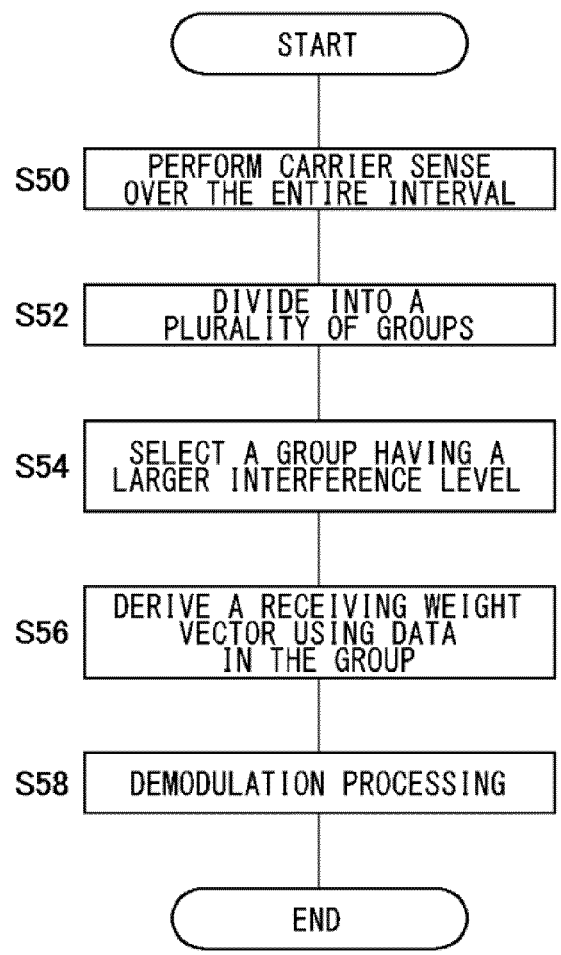
FIG. 5 is a flowchart showing a receiving processing according to a modification of the exemplary embodiment.

FIG. 5 is a flowchart showing a receiving processing according to the modification of the exemplary embodiment. The measurement unit 20 performs carrier sense over the entire interval (S50). The decision unit 24 divides OFDM signals into a plurality of groups, based on the result of carrier sense (S52). The decision unit 24 selects groups whose interference level is large (S54). The processing unit 16 derives a receiving weight vector using data in the group (S56). The processing unit 16 and the combining unit 18 perform demodulation processing (S58).

A description is now given of another modification of the exemplary embodiment. Similar to the exemplary embodiment, the another modification relates to a receiving apparatus wherein the OFDM signals are divided into a plurality of groups and the adaptive array signal processing is performed on the groups. In the above-described exemplary embodiment and the modification thereof, a plurality of groups are defined in the frequency domain. However, in the another modification, a plurality of groups are defined in the time domain as well. That is, in a given subcarrier, those preceding a burst signal and those subsequent to the burst signal are associated with different groups, respectively.

In this case, there may occur a group where the number of input vectors used to derive a receiving weight vector is small, namely the number of data is small. If the number of data is small, deriving a weight vector using such data may lead to the reduction in accuracy of the receiving weight vector. In the light of this, the receiving apparatus according to the another modification couples a group having a small number of data with another group, thereby increasing the number of data.

A receiving apparatus 100 according to the another modification is of a similar type to the receiving apparatus 100 shown in FIG. 1. Thus, only the differences will be mainly described hereinbelow. The decision unit 24 defines a plurality of groups. In the another modification, the stage is determined for each data, and the OFDM signals are sometimes divided into a plurality of groups in the time-axis direction as well. The decision unit 24 compares the number of data contained in each group with a threshold value. If the number of data is smaller than the threshold value, namely if the size of a group is small, the decision unit 24 will couple said group with another group. In such a case, the decision unit 24 couples said group with a group corresponding to a subcarrier or symbol adjacent to said group. If there is a plurality of such groups, the decision unit 24 will preferentially couple said group with a group whose interference level is larger than that of said group. Such coupling is repeatedly done until the number of data becomes equal to or greater than the threshold value.

Figure 6:
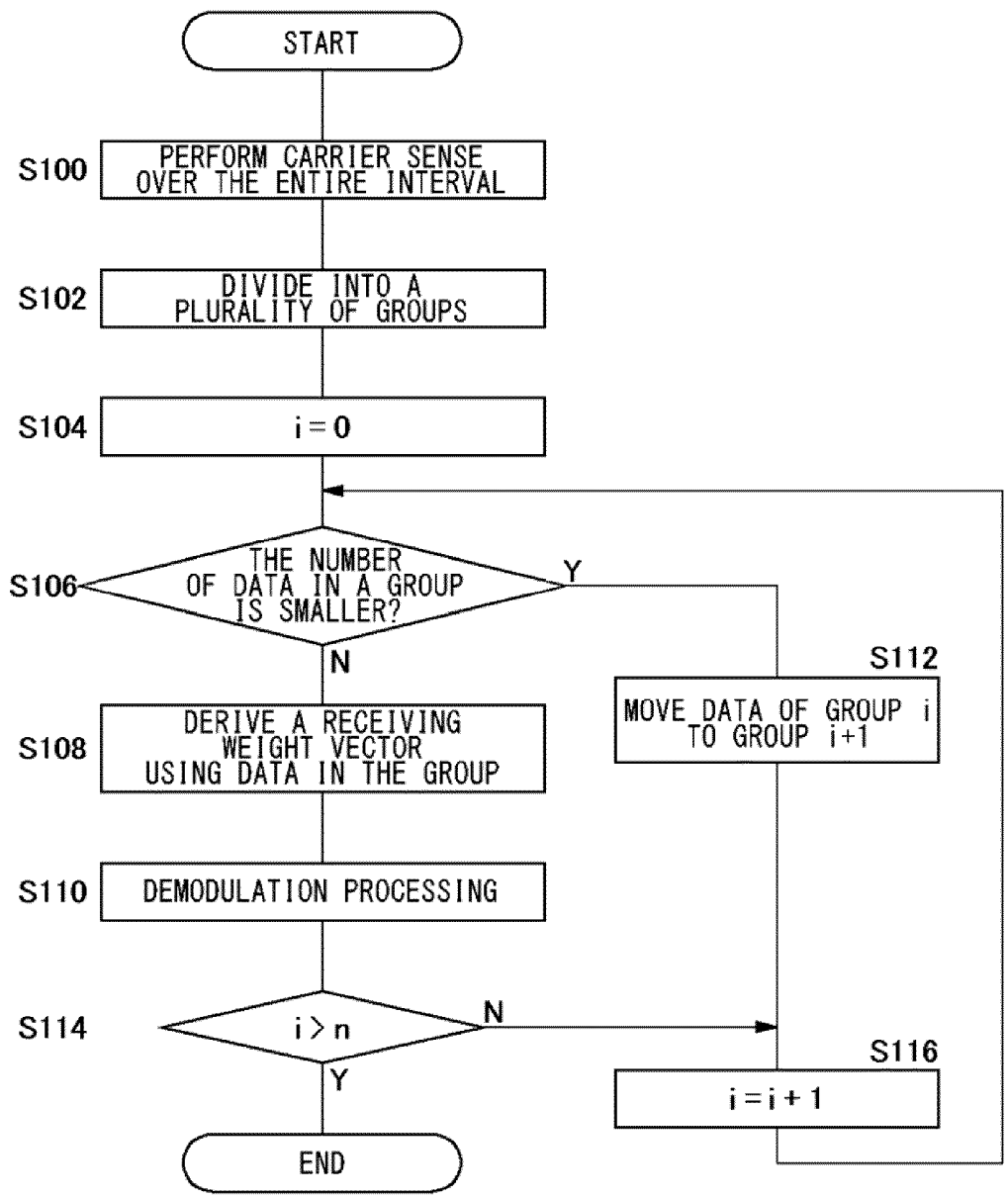
FIG. 6 is a flowchart showing a receiving processing according to another modification of the exemplary embodiment.

FIG. 6 is a flowchart showing a receiving processing according to the another modification of the exemplary embodiment. The measurement unit 20 performs carrier sense over the entire interval (S100). The decision unit 24 divides OFDM signals into a plurality of groups, based on the result of carrier sense (S102). The decision unit 24 sets "i" to "0" (S104). If the number of data in a group is less than the threshold value (Y of S106), the decision unit 24 will move the data of group i to group i+1 (S112). The decision unit 24 adds "1" to "i" (S116) and the procedure is returned to Step 106. If, on the other hand, the number of data in the group is not less than the threshold value (N of S106), the processing unit 16 will derive a receiving weight vector using the data in the group (S108). The processing unit 16 and the combining unit 18 perform demodulation processing (S110). If i>n does not hold (N of S114), the decision unit 24 will add "1" to "i" (S116) and the procedure will be returned to Step 106. If, on the other hand, i>n holds (Y of S114), the processing will be terminated.

A description is now given of still another modification of the exemplary embodiment. A description has been given so far of the receiving apparatus, and in the still another modification a description is given of a base station apparatus provided with the receiving functions described so far. The base station apparatus communicates with a terminal apparatus by assigning a channel to the terminal apparatus to be communicated. It is assumed here that the base station apparatus performs OFDMA in the frequency domain and TDMA in the time domain. Though there are a downlink channel in the direction from a base station apparatus to terminal apparatuses and an uplink channel in the direction from the terminal apparatuses to the base station apparatus, these channels will be hereunder generically referred to simply as "channel" also.

The base station apparatus measures the interference level of OFDMA signals as a whole and the compares the measured interference level with a threshold value. If the interference level is larger than the threshold value, each group will be defined by a certain fixed number of contiguous subcarriers and a certain fixed number of contiguous symbols. Also, a group is assigned as a channel for a terminal. If, on the other hand, the interference level is not larger than the threshold value, an arbitrary subcarrier or symbol will be assigned to a terminal apparatus as a channel.

Figure 7:
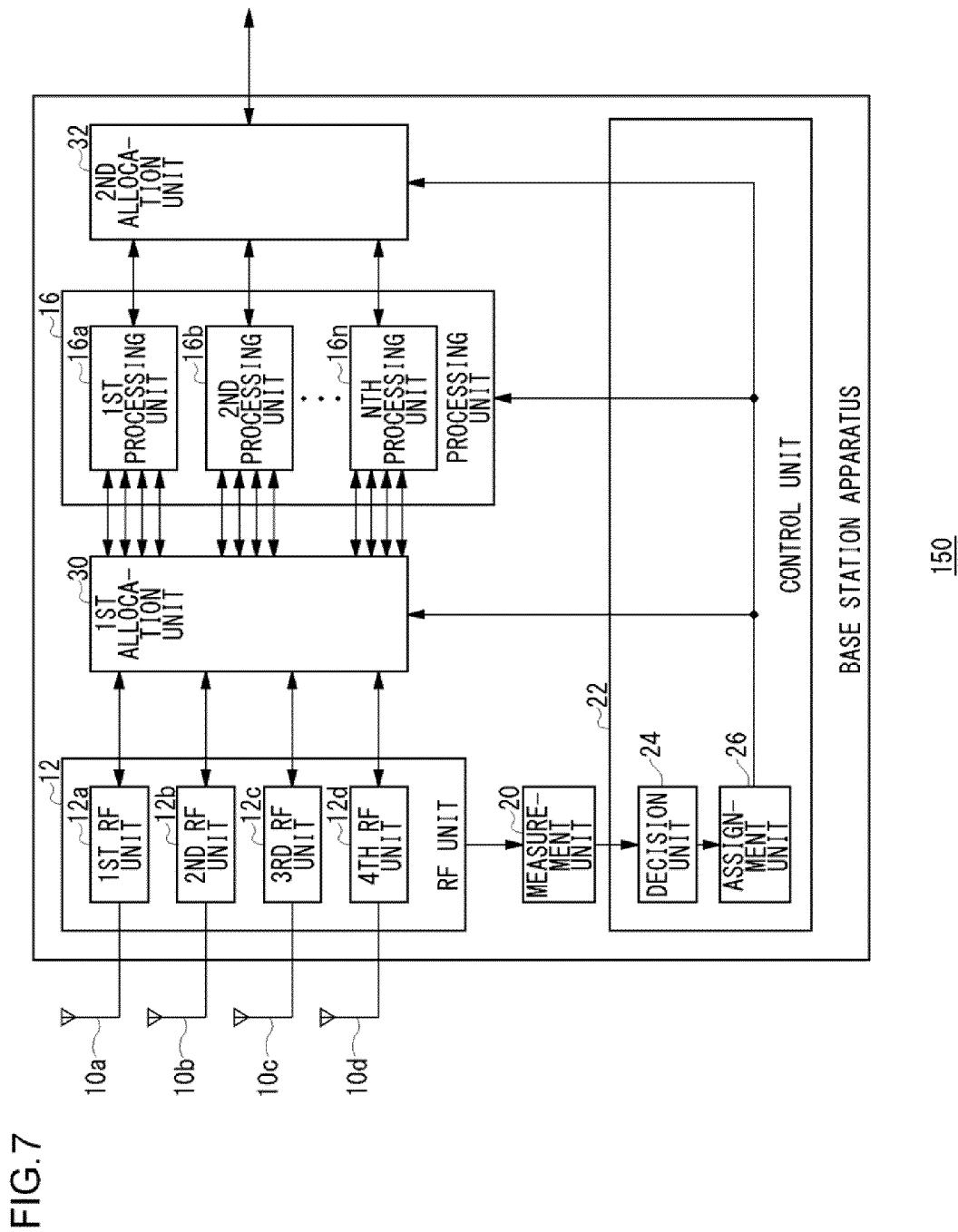
FIG. 7 shows a structure of a base station apparatus according to still another modification of the exemplary embodiment.

FIG. 7 shows a structure of a base station apparatus 150 according to the still another modification of the exemplary embodiment. The base station apparatus 150 includes a first antenna 10a, a second antenna 10b, a third antenna 10c and a fourth antenna 10d, which are generically referred to as "antenna 10" or "antennas 10", a first RF unit 12a, a second RF unit 12b, a third RF unit 12c and a fourth RF unit 12d, which are generically referred to as "RF unit 12" or "RF units 12", a first allocation unit 30, a first processing unit 16a, a second processing unit 16b, and an Nth processing unit 16n, which are generically referred to as "processing unit 16" or "processing units 16", a second allocation unit 32, a measurement unit 20, and a control unit 22. The control unit 22 includes a decision unit 24 and an assignment unit 26.

The antennas 10, the RF units 12, the first allocation unit 30, the processing units 16 and the second allocation unit 32 carry out similar processings to those performed, as the receiving processings, by the antennas 10, the RF units 12, the division unit 14, the processing units 16 and the combining unit 18 shown in FIG. 1, respectively. In other words, the first allocation unit 30 corresponds to the division unit 14, whereas the second allocation unit 32 corresponds to the combining unit 18. On the other hand, the second allocation unit 32, the processing units 16, the first allocation unit 30, the RF units 12 and the antennas 10 carry out processings reverse to the receiving processing, as the transmission processing. Here, the processing units 16 derive a transmission weight vector when the transmission processing is carried out. In other words, the RF units 12, the first allocation unit 30, the processing units 16 and the second allocation unit 32 communicate with a not-shown terminal apparatus using OFDM signals via a plurality of antennas 10.

The measurement unit 20 measures the interference level of the interference signals as a whole as shown in FIG. 2. It may be said that this equals the integrated value of the interference level for each data. The measurement unit 20 outputs the measured interference level to the decision unit 24. The decision unit 24 compares the interference level with a threshold value. If the interference level is larger than the threshold value, the decision unit 24 will define a group by a certain fixed number of contiguous subcarriers and a certain fixed number of contiguous symbols. For example, each group is defined by three contiguous subcarriers and three contiguous symbols. Note here that a group corresponds to a channel. If, on the other hand, the interference level is not larger than the threshold value, the decision unit 24 will define an arbitrary subcarrier or symbol as a channel. The decision unit 24 outputs the information on the thus defined channel to the assignment unit 26. The assignment unit 26 assigns the channel to the terminal apparatus. A known technology may be used to assign the channels and therefore the description thereof is omitted here.

Figure 8:
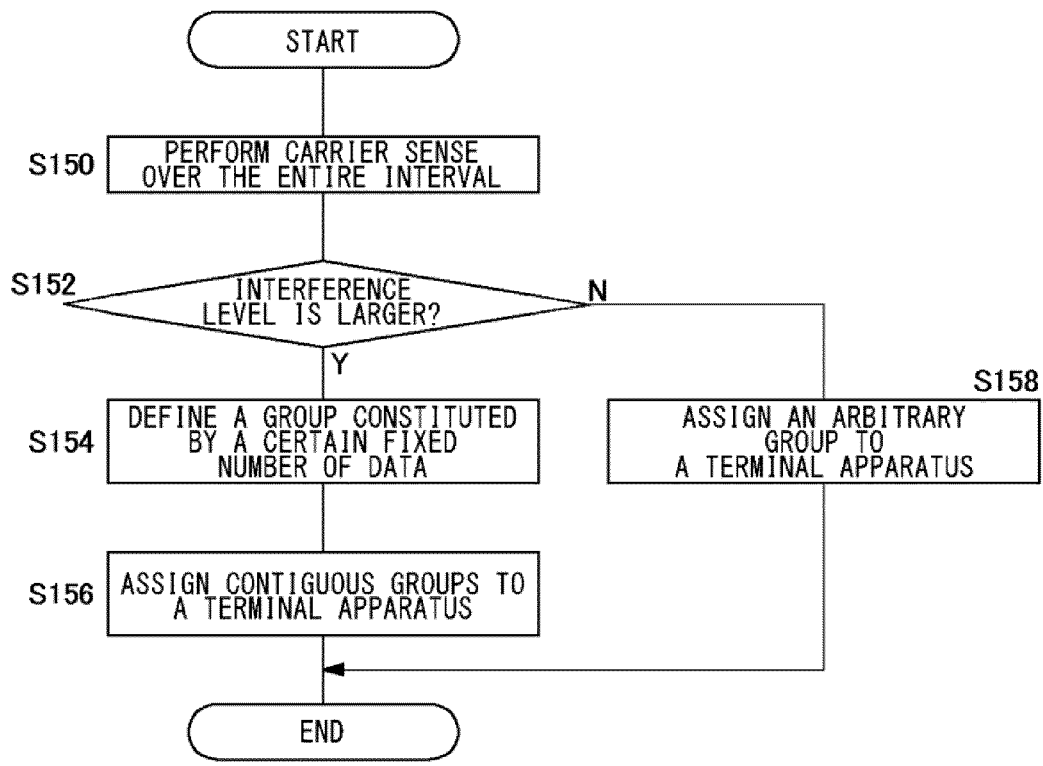
FIG. 8 is a flowchart showing an assignment processing performed by a base station apparatus of FIG. 7.

FIG. 8 is a flowchart showing an assignment processing performed by the base station apparatus 150. The measurement unit 20 performs carrier sense over the entire interval (S150). If the interference level is larger than the threshold value (Y of S152), the decision unit 24 will define a group constituted by a certain fixed number of data (S154). The assignment unit 26 assigns contiguous groups to a terminal apparatus (S156). If, on the other hand, the interference level is not larger than the threshold value (N of S152), the assignment unit 26 will assign an arbitrary group to a terminal apparatus (S158).

By employing the exemplary embodiment of the present invention, OFDM signals are divided into a plurality of groups and the adaptive array signal processing is performed for each of the groups. As a result, the increase in the amount of calculation can be suppressed. Also, the groups are defined according to the interference level on a subcarrier-by-subcarrier basis, so that subcarriers belonging to a similar interference level can be put into a single group. Also, since the subcarriers belonging to a similar interference level can be put into a single group, the degradation of interference removal capacity can be suppressed even if a common receiving weight vector is used for each group. Also, since the degradation of interference removal capacity is suppressed, the receiving quality can be improved. Also, since a common receiving weight vector is used for each group, the degradation of interference removal capacity can be suppressed while the increase in the amount of calculation is suppressed.

Also, if the size of a group is small, said group will be integrated into another group. Thus, the degradation in estimate accuracy of the receiving weight vector can be suppressed. Also, the adaptive array signal processing is preferentially performed on groups whose channel quality is degraded. Thus, the amount of calculation can be further reduced while the degradation of interference removal capacity is suppressed. Also, the unit of channel assignment is varied according to the interference level of OFDM signals as a whole, so that the increase in the amount of calculation can be suppressed and at the same time the degradation of interference removal capacity can be suppressed. Also, when the interference level is large, contiguous subchannels and symbols are assigned to a terminal apparatus, so that the degradation of interference removal capacity can be suppressed while the amount of calculation is suppressed.

The present invention has been described based on the exemplary embodiment. This embodiment is intended to be illustrative only, and it is understood by those skilled in the art that various modifications to constituting elements and processes could be further developed and that such modifications are also within the scope of the present invention.

In the exemplary embodiment of the present invention, the decision unit 24 defines a plurality of groups in the frequency domain. However, this should not be considered as limiting and, for example, the decision unit 24 may define the plurality of groups in the time domain as well. According to this modification, the interference removal capacity can be improved.

Industrial Applicability

The present invention suppresses the increase in the amount of calculation and at the same time suppresses the degradation of interference removal capacity.

What is claimed is:

1. A radio apparatus, comprising:
   a receiver configured to receive multicarrier signals via a plurality of antennas;
   a division unit configured to divide the multicarrier signals received by said receiver, into a plurality of groups in a frequency domain; and
   a processing unit configured to perform adaptive array signal processing for each of the groups divided by said division unit,
   wherein said division unit acquires a channel quality for each subcarrier, in the frequency domain, contained in the multicarrier signal and sets the plurality of groups according to the channel quality such that the quality of subcarriers in a group are mapped to the same predefined stage and the group includes a set of subcarriers adjacent to each other.

2. A radio apparatus according to claim 1, wherein said processing unit preferentially performs the adaptive array signal processing on a group, whose channel quality deteriorates, out of the plurality of groups defined by said division unit.

3. A radio apparatus, comprising:
   a receiver configured to receive multicarrier signals via a plurality of antennas;
   a division unit configured to divide the multicarrier signals received by said receiver, into a plurality of groups in a frequency domain; and
   a processing unit configured to perform adaptive array signal processing for each of the groups divided by said division unit,
   wherein said division unit acquires a channel quality for each subcarrier, in the frequency domain, contained in the multicarrier signal and sets the plurality of groups according to the channel quality, wherein when the size of a predetermined group is smaller than a threshold value, said division unit couples the predetermined group to another group.

* * * * *